(12) United States Patent
Chen et al.

(10) Patent No.: US 7,589,813 B2
(45) Date of Patent: Sep. 15, 2009

(54) LIQUID CRYSTAL DISPLAY PANEL AND ARRAY SUBSTRATE THEREOF

(75) Inventors: Chieh-Wei Chen, Hsinchu (TW); Cheng-Han Tsao, Hsinchu (TW); Te-Wei Chan, Hsinchu (TW); Jenn-Jia Su, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 154 days.

(21) Appl. No.: 11/942,508

(22) Filed: Nov. 19, 2007

(65) Prior Publication Data
US 2009/0086142 A1   Apr. 2, 2009

(30) Foreign Application Priority Data
Sep. 27, 2007   (TW) .............................. 96135918 A

(51) Int. Cl.
*G02F 1/1337*   (2006.01)
(52) U.S. Cl. ....................... 349/129; 349/130
(58) Field of Classification Search ................ 349/129, 349/130
See application file for complete search history.

(56) References Cited

U.S. PATENT DOCUMENTS

| | | | |
|---|---|---|---|
| 6,839,112 B2 | 1/2005 | Chien et al. | |
| 6,972,812 B2 | 12/2005 | Lu et al. | |
| 7,499,131 B2* | 3/2009 | Sasabayashi | 349/123 |
| 2005/0253797 A1 | 11/2005 | Kamada et al. | |
| 2006/0192739 A1 | 8/2006 | Shin et al. | |
| 2007/0008263 A1 | 1/2007 | Kim | |
| 2007/0103607 A1 | 5/2007 | Hanaoka et al. | |
| 2007/0121048 A1 | 5/2007 | Hsu et al. | |
| 2008/0088783 A1* | 4/2008 | Tai et al. | 349/129 |

* cited by examiner

*Primary Examiner*—David Nelms
*Assistant Examiner*—David Y Chung
(74) *Attorney, Agent, or Firm*—J.C. Patents

(57) ABSTRACT

A liquid crystal display panel includes an array substrate, an opposite substrate having an opposite electrode, a liquid crystal layer located therebetween, first alignment patterns and second alignment patterns. The array substrate includes scan lines, data lines and pixel units electrically connecting corresponding scan lines and data lines. Each pixel unit includes a first active device, a first pixel electrode electrically connecting the first active device and a second pixel electrode. The first pixel electrode and the second pixel electrode are separated to define a first displaying region and a second displaying region. The extending directions of the first alignment patterns in the first displaying region and the second alignment patterns in the second displaying region respectively intersect the extending direction of the scan lines at a smaller first acute angle and a greater acute angle for controlling the arrangements of the liquid crystal molecules.

20 Claims, 7 Drawing Sheets

LIQUID CRYSTAL DISPLAY PANEL AND ARRAY SUBSTRATE THEREOF

CROSS-REFERENCE TO RELATED APPLICATION

This application claims the priority benefit of Taiwan application serial no. 96135918, filed on Sep. 27, 2007. The entirety of the above-mentioned patent application is hereby incorporated by reference herein and made a part of this specification.

BACKGROUND OF THE INVENTION

1. Field of the Invention

The present invention generally relates to a liquid crystal display (LCD) panel and an array substrate thereof, and more particularly, to an LCD panel with wide viewing feature.

2. Description of Related Art

As the LCD technology continuously advances towards a bigger display screen, in order to overcome the limited viewing angle problems with a big screen specification, the related LCD manufactures continuously strive to develop the wide viewing techniques so as to expect a breaking though, wherein a significant result, multi-domain vertical alignment LCD panel (MVA LCD panel), belongs to one of familiar wide viewing techniques today.

The so-called MVA LCD panel is based on the principle that an alignment pattern design is adopted in an LCD panel, so that molecules within a single pixel region are divided into a plurality of different alignment domains to achieve wide viewing effect. However, restricted by the optical behavior of the liquid crystal molecules themselves, when an MVA LCD panel is viewed by a user in different viewing directions, a color shift or color washout phenomenon may occur. In particular, the color shift or color washout phenomenon appears more seriously with a display image of low/middle gray levels. To improve the above-mentioned phenomenon, a scheme has been provided that a plurality of display regions having different luminance is formed within a single pixel region and a plurality of alignment areas is further formed within each of the displaying regions having different luminance by improving the driving principle and the pixel design.

FIG. 1 is a partial schematic view of a conventional LCD panel. An LCD panel 100 includes scan lines 102, data lines 104, pixel electrodes 106 and 108, first active devices 110 and second active devices 112. In FIG. 1, only one of each above-mentioned component is shown. The scan line 102 and the data line 104 are respectively electrically connected to the corresponding first active device 110 and second active device 112, while the first active device 110 and the second active device 112 are respectively electrically connected to the pixel electrodes 106 and 108. Each of the pixel electrodes 106 and 108 has a plurality of stripe-electrode patterns, and a plurality of alignment slits 114 are formed between any two adjacent stripe-electrode patterns. The alignment slits 114 are for controlling the orientation arrangements of the liquid crystal molecules in the LCD panel. In addition, the alignment slits in each of the pixel electrodes 106 and 108 are divided into four sets respectively with different extending directions. In this way, in terms of positions, each of the pixel electrodes 106 and 108 is divided into four alignment areas P of four specific alignment domains.

Generally speaking, the included angle between the extending direction of the alignment slits 114 and the that of the scan line 102 within each alignment area P keeps 45°, as shown by FIG. 1, are adapted to achieve a consistent display effect and a constant range of display viewing angles for different viewing directions. Note that it is very often the range of viewing angles and the required display quality in some viewing directions, for example in the extending direction of the scan line 102, of a display product relevant to an LCD panel are highly demanded by the requirement of the market and the users. Accordingly, the extending directions of the alignment slits 114 are adjusted during designing the LCD panel 100, so that the liquid crystal molecules incline close to the specific directions to obtain a larger range of viewing angles in the specific directions. Though such a design scheme is able to widen the range of viewing angles in the specific directions, the display luminance of a display product in other directions may be degraded. Therefore, how to widen the range of viewing angles in specific directions, lower down the probability of color shift or color washout in different viewing directions and further enable a display apparatus to keep appropriate display luminance has become a key development of fabricating LCD panels.

SUMMARY OF THE INVENTION

Accordingly, the present invention is directed to an LCD panel and an array substrate thereof having a wider range of viewing angles in specific viewing directions and reduces the problems due to color shift or color washout phenomenon in specific viewing directions.

The present invention provides an LCD panel, which includes an array substrate, an opposite substrate, a liquid crystal layer, a plurality of first alignment patterns and a plurality of second alignment patterns. The array substrate includes a plurality of scan lines, a plurality of data lines and a plurality of pixel units. The data lines and the scan lines are respectively electrically connected to the corresponding pixel unit. Each of the pixel units includes a first active device, a first pixel electrode and a second pixel electrode, wherein the first active device is electrically connected to the first pixel electrode, and the first pixel electrode is separated from the second pixel electrode to define a first displaying region and a second displaying region. The opposite substrate includes an opposite electrode, and the liquid crystal layer is disposed between the array substrate and the opposite substrate. The first alignment pattern and the second alignment pattern are respectively disposed within the first displaying region and the second displaying region. The extending directions of the first alignment pattern and the second alignment pattern respectively intersect the extending direction of the scan line at a first acute angle and a second acute angle for controlling the arrangements of the liquid crystal molecules in the liquid crystal layer, and the first acute angle is smaller than the second acute angle.

In an embodiment of the present invention, the above-mentioned first alignment patterns include a plurality of first alignment slits. The first alignment slits are, for example, formed on the opposite electrode or on the first pixel electrodes. In addition, the first pixel electrode includes a first cross-electrode pattern and a plurality of first stripe-electrode patterns, wherein the first cross-electrode pattern divides the corresponding first displaying region into a plurality of areas. Within each area, a terminal of one (or each) first stripe-electrode pattern is, for example, connected to the first cross-electrode pattern, while another terminal of the one (or each) first stripe-electrode pattern is far from the first cross-electrode pattern. The first alignment slits are located between the first stripe-electrode patterns and the first cross-electrode patterns.

In an embodiment of the present invention, the above-mentioned second alignment patterns include a plurality of second alignment slits. The second alignment slits are formed on the opposite electrode or on the second pixel electrodes. In addition, each of the second pixel electrodes includes a second cross-electrode pattern and a plurality of second stripe-electrode patterns, wherein the second cross-electrode pattern divides the corresponding second displaying region into a plurality of areas. Within each area, a terminal of one (or each) second stripe-electrode pattern is, for example, connected to the second cross-electrode pattern, while another terminal of the one (or each) second stripe-electrode pattern is far from the second cross-electrode pattern. Each second alignment slits are located between each second stripe-electrode patterns and the second cross-electrode patterns.

In an embodiment of the present invention, the above-mentioned first alignment patterns include a plurality of first alignment protrusions disposed on one of the array substrate and the opposite substrate.

In an embodiment of the present invention, the above-mentioned second alignment patterns include a plurality of second alignment protrusions disposed on one of the array substrate and the opposite substrate.

In an embodiment of the present invention, each on of the above-mentioned pixel units further includes a second active device electrically connected to one of the scan lines and one of the data lines and to the second pixel electrode. In addition, the first active device electrically connected to the corresponding scan line and a corresponding data line, and is electrically coupled to the second active device. Alternatively, the first active device and the second active device are respectively electrically connected to different data lines.

In an embodiment of the present invention, the above-mentioned array substrate further includes a plurality of first capacitor electrodes and a plurality of second capacitor electrodes, wherein the first capacitor electrodes are located within the first displaying region, while the second capacitor electrodes are located within the second displaying region. The voltage of the first capacitor electrode is, for example, different from the voltage of the second capacitor electrode. In other words, the voltage applied to the first capacitor electrode is, for example, different from that to the second capacitor electrode.

In an embodiment of the present invention, the above-mentioned first acute angle is about 35° to 45°, while the second acute angle is about 45° to 55°.

The present invention adopts a design of alignment patterns with different extending directions in the LCD panel so as to produce a more effective compensation effect to the display effect of the LCD panel in a specific direction to further satisfy the demand of users on a larger range of viewing angles in the above-mentioned specific direction. Besides, the LCD panel of the present invention still has the almost same maximum display luminance as that of a conventional LCD panel. In this way, the LCD panel of the present invention not only has an extraordinary wide range of viewing angles in a specific direction, but also keeps good display quality as viewing at a smaller viewing angle or as front viewing.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
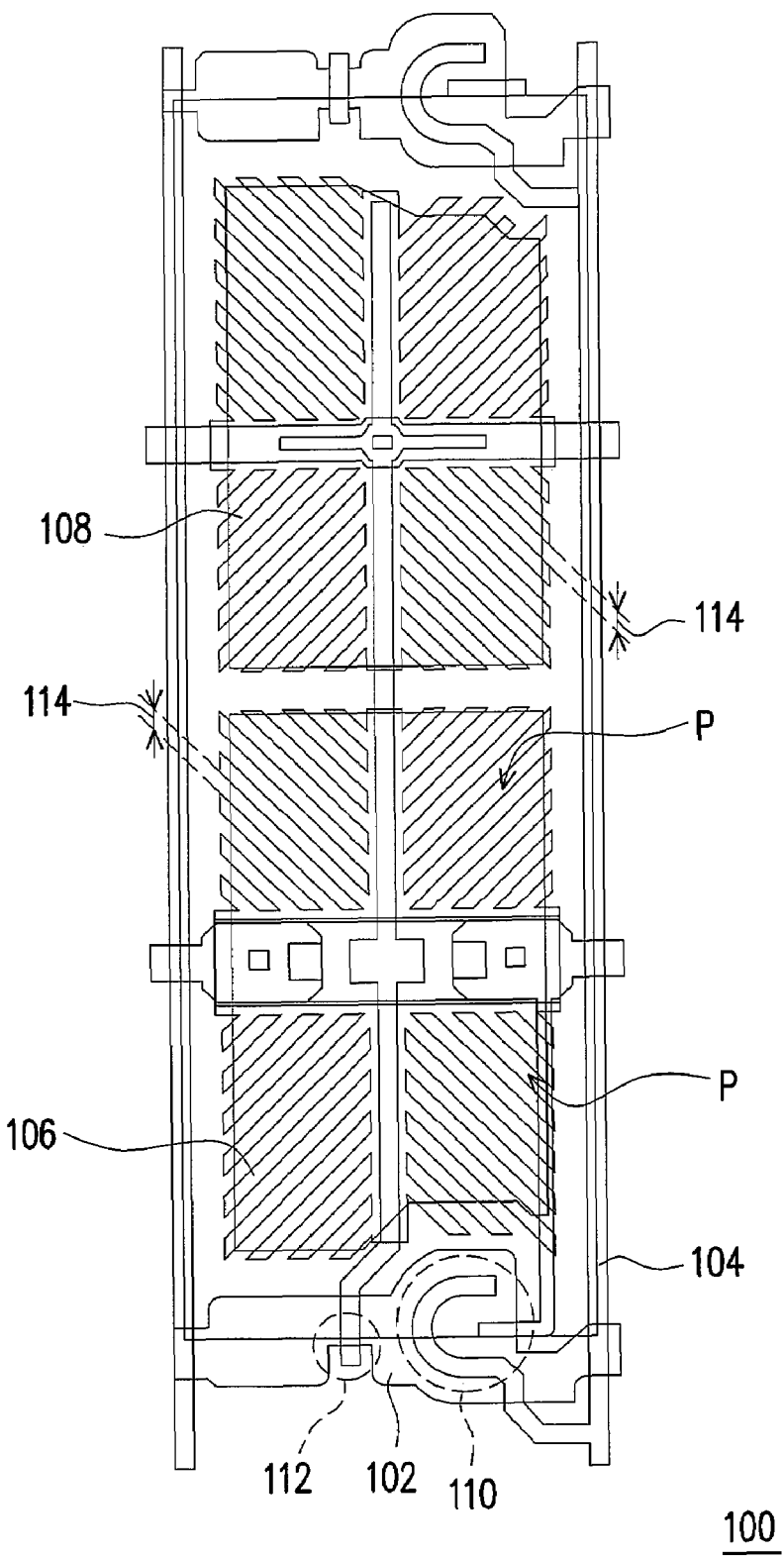
FIG. 1 is a partial schematic view of a conventional LCD panel.

Reference will now be made in detail to the present preferred embodiments of the invention, examples of which are illustrated in the accompanying drawings. Wherever possible, the same reference numbers are used in the drawings and the description to refer to the same or like parts.

Figure 2:
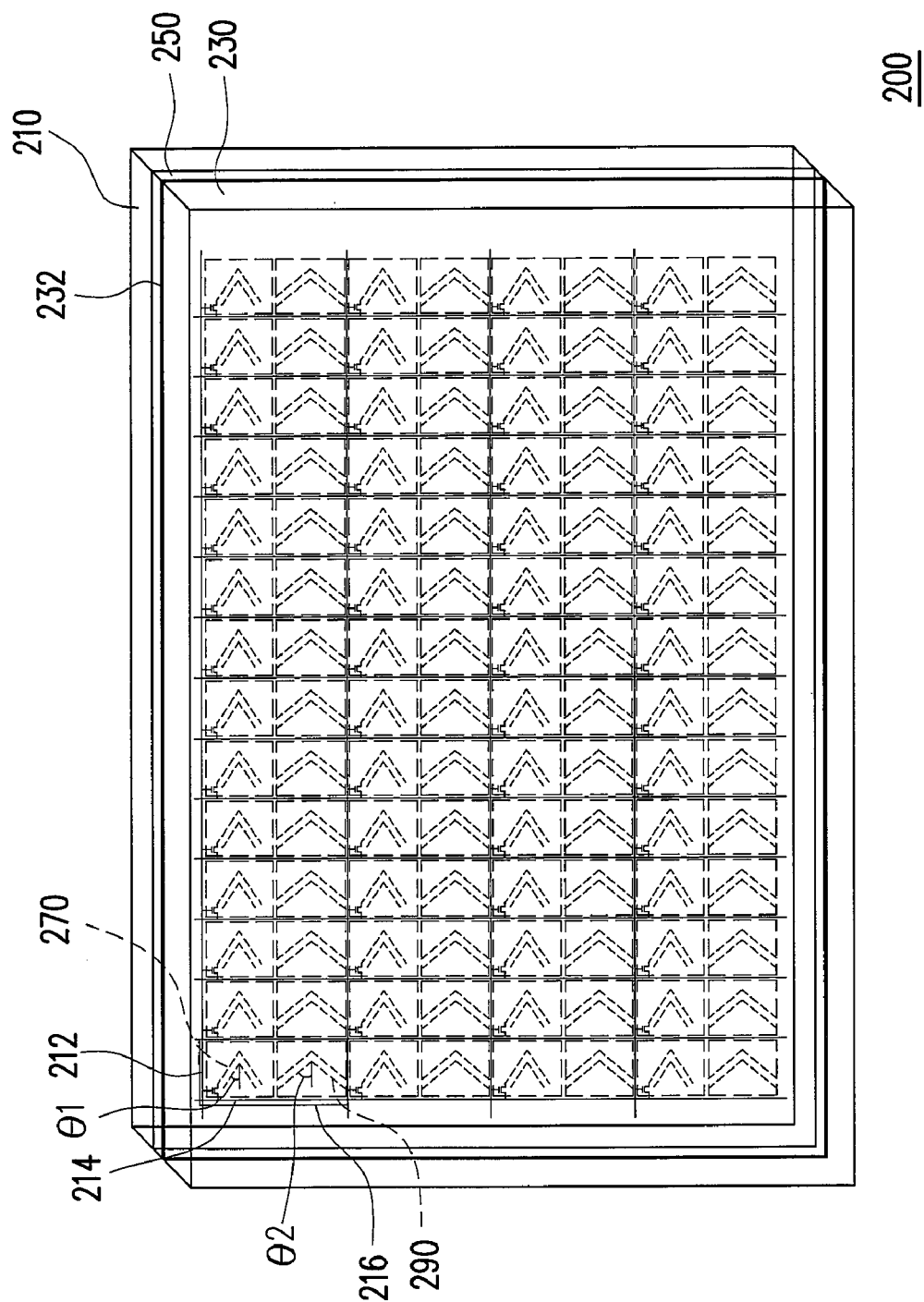
FIG. 2 is a schematic perspective drawing of an LCD panel according to an embodiment of the present invention.

FIG. 2 is a schematic perspective drawing of an LCD panel according to an embodiment of the present invention. Referring to FIG. 2, an LCD panel 200 includes an array substrate 210, an opposite substrate 230, a liquid crystal layer 250, a plurality of first alignment patterns 270 and a plurality of second alignment patterns 290. The array substrate 210 includes a plurality of scan lines 212, a plurality of data lines 214 and a plurality of pixel units 216. The scan lines 212 and the data lines 214 are respectively electrically connected to a corresponding pixel unit 216. The opposite substrate 230 includes opposite electrodes 232, and the liquid crystal layer 250 is disposed between the array substrate 210 and the opposite substrate 230.

Figure 3:
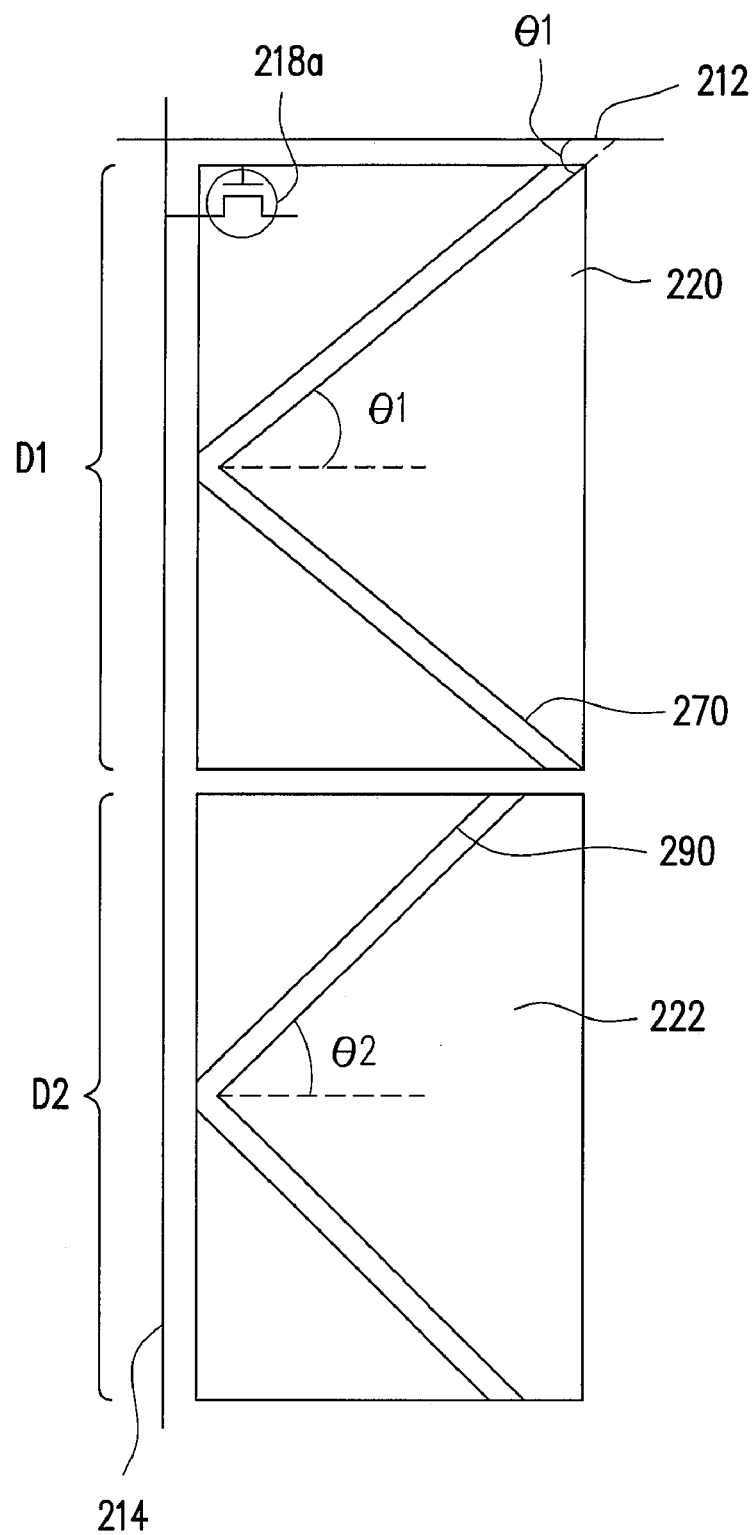
FIG. 3 is a schematic top view of the LCD panel in FIG. 2, wherein only one pixel unit is shown.

FIG. 3 is a schematic top view of the LCD panel in FIG. 2, wherein only one pixel unit is shown. Referring to FIGS. 2 and 3, each of the pixel units 216 is disposed on the array substrate 210 and includes a first active device 218a, a first pixel electrode 220 and a second pixel electrode 222, wherein the first active device 218a is electrically connected to the corresponding data line 214, the corresponding scan line 212 and the first pixel electrode 220. The second pixel electrode 222 can be electrically coupled to the first active device 218a via capacitance coupling or electrically connected to the corresponding data line 214 and scan line 212 through another active device (not shown). The first pixel electrode 220 is separated from the second pixel electrode 222 to define a first displaying region D1 and a second displaying region D2. The first alignment pattern 270 and the second alignment pattern 290 are respectively disposed within the first displaying region D1 and the second displaying region D2. The first alignment pattern 270 and the second alignment pattern 290 are, for example, respectively composed of a plurality of linear or nonlinear patterns. The extending directions of the first alignment pattern 270 and the second alignment pattern 290 respectively intersect that of the scan line 212 at a first acute angle θ1 and a second acute angle θ2 for controlling the orientation arrangements of the liquid crystal molecules in the liquid crystal layer 230, and the first acute angle θ1 is smaller than the second acute angle θ2; for example, the first acute angle θ1 is about between 35° and 45°, while the second acute angle θ2 is about between 45° and 55°.

In more detail, the first alignment pattern 270 and the second alignment pattern 290 are respectively composed of a plurality of alignment slits, a plurality of alignment protrusions or a plurality of combinations thereof. In addition, the first alignment pattern 270 and the second alignment pattern 290 may be disposed on the array substrate 210, or on the opposite substrate 230 or on both the substrates 210 and 230. Specifically, when both the first alignment pattern 270 and the second alignment pattern 290 are alignment slits, the first alignment pattern 270 may be alignment slits formed on the first pixel electrode 220 and the second alignment pattern 290 may be alignment slits formed on the second pixel electrode 222; or the first alignment pattern 270 and the second alignment pattern 290 are alignment slits formed on the opposite substrate 230. Similarly, when both the first alignment pattern 270 and the second alignment pattern 290 are alignment protrusions, the first alignment pattern 270 and the second alignment pattern 290 may be disposed on at least one of the array substrate 210 and the opposite substrate 230. In addition, the first alignment pattern 270 and the second alignment pattern 290 may respectively be combinations of alignment slits and alignment protrusions, wherein alignment slits and alignment protrusions may be disposed together or alternatively on one of the array substrate 210 and the opposite substrate 230, or respectively on the array substrate 210 and the opposite substrate 230.

Generally speaking, a display product relevant to the LCD panel 200 has a wider dimension in the extending direction of the scan line 212 than the other direction, which is in accordance with the range of viewing angles of human body. Accordingly, it is very often the range of viewing angles of a display product in the extending direction of the scan line 212 is highly demanded by the market; in particular, the above-mentioned requirement is more critical for a display product with a big screen or a wide-screen. When the LCD panel 200 is in displaying mode, the liquid crystal molecules in the liquid crystal layer 250 would be affected by the first alignment pattern 270 and the second alignment pattern 290 to incline to different directions so as to achieve a wide viewing display effect. Once the liquid crystal molecules incline close to the extending direction of the scan line 212, the range of display viewing angles in the above-mentioned direction can be wider, and it is helpful to lower down the probability of color shift or color washout in different viewing directions.

However, the scheme to make the all liquid crystal molecules incline close to the extending direction of the scan line 212 may degrade the display effect of the LCD panel 200 in other directions. To solve the problem, the present invention disposes a first alignment pattern 270 and a second alignment pattern 290 within a single pixel unit 216. The extending direction of the first alignment pattern 270 and the extending direction of the second alignment pattern 290 respectively intersect the extending direction of the scan line 212 at different angles, so that a part of the liquid crystal molecules incline closer to the extending direction of the scan line 212. In this way, the range of viewing angles of the LCD panel 200 gets wider in the extending direction of the scan line 212, while a good display effect still maintains in other directions. Several embodiments of the present invention, which do not limit the present invention, are depicted in the following to express the structure of the invented LCD panel.

Figure 4:
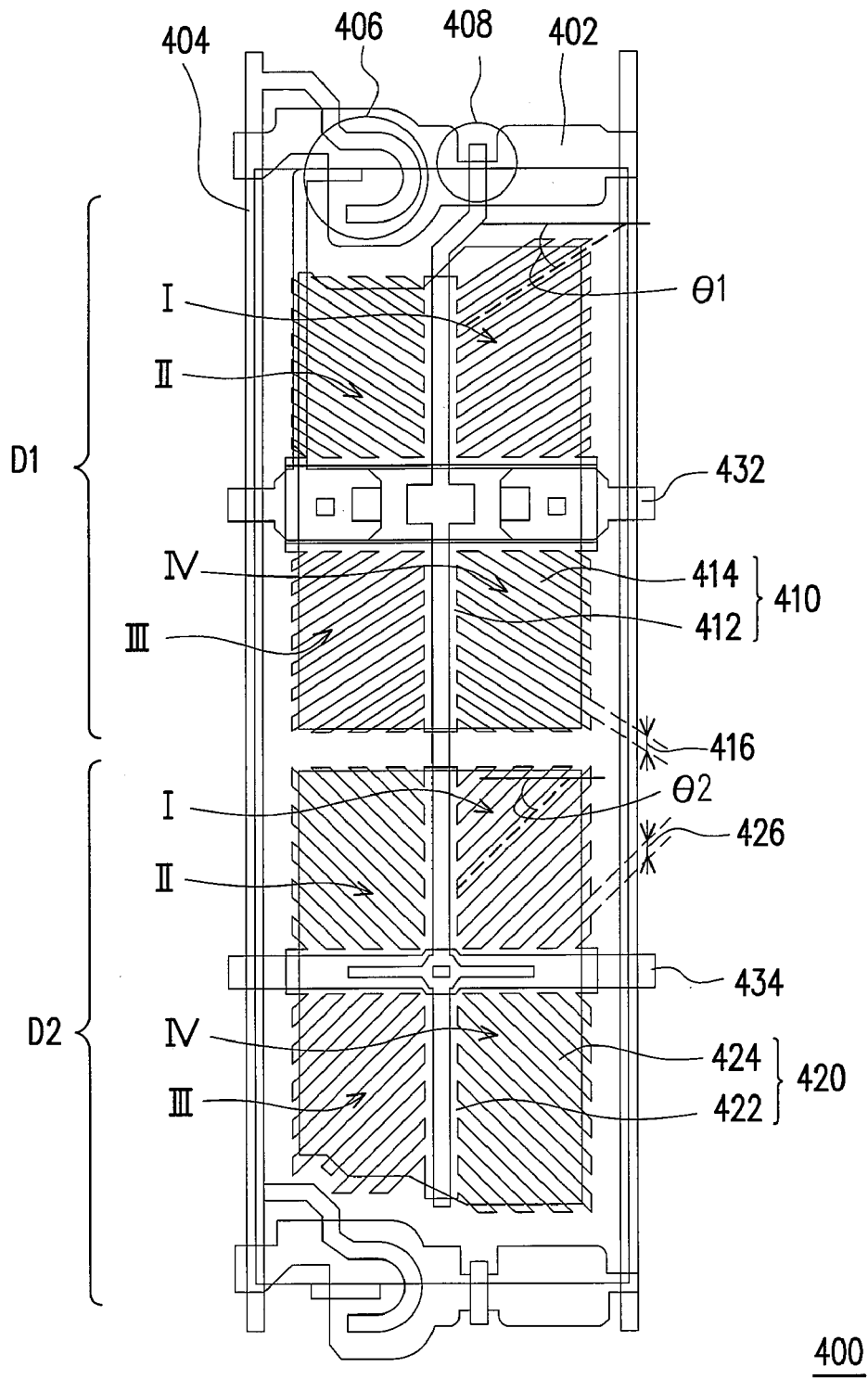
FIG. 4 is a partial schematic top view of an LCD panel according to an embodiment of the present invention.

FIG. 4 is a partial schematic top view of an LCD panel according to an embodiment of the present invention, wherein only a single pixel unit is shown. Referring to FIG. 4, a pixel unit 400 is electrically connected to a scan line 402 and a data line 404 and includes a first active device 406, a second active device 408, a first pixel electrode 410 and a second pixel electrode 420, wherein the first active device 406 is electrically connected to the first pixel electrode 410 and the second active device 408 is electrically connected to the second pixel electrode 420. Besides, the first active device 406 is electrically connected to the data line 404 and the scan line 402, while the first active device 406 is electrically coupled to the second active device 408.

In the pixel unit 400, the first active device 406 and the second active device 408 both connected to the scan line 402 and the data line 404 are switches for controlling the first pixel electrode 410 and the second pixel electrode 420 respectively. The first pixel electrode 410 and the second pixel electrode 420 respectively define a first displaying region D1 and a second displaying region D2. In the embodiment, an substrate (not marked) having the pixel unit 400 further includes multiple bars of first capacitor electrodes 432 and multiple bars of second capacitor electrodes 434 disposed on the array substrate. For simplicity, only one bar of each capacitor electrode is shown in FIG. 4. The first capacitor electrode 432 is, for example, located within the first displaying region D1 and the second capacitor electrode 434 is located within the second displaying region D2.

When the pixel unit 400 is in displaying mode, the capacitance coupling of the first capacitor electrode 432 and the second capacitor electrode 434 enables the liquid crystal molecules over the first pixel electrode 410 and the second pixel electrode 420 to be affected respectively by different voltage variances, so that the first displaying region D1 and the second displaying region D2 having different display luminance are respectively defined. In more detail, by adjusting the sizes of the first capacitor electrode 432 and the second capacitor electrode 434 respectively within the first displaying region D1 and the second displaying region D2 or by applying different voltages to the first capacitor electrode 432 and the second capacitor electrode 434, the first displaying region D1 and the second displaying region D2 produce different display luminance. In the present embodiment, the first capacitor electrode 432 and the second capacitor electrode 434 are laid out in this way to make the first displaying region D1 has higher display luminance than that of the second displaying region D2.

It is well known that the higher display luminance one of the first displaying region D1 and the second displaying region D2 may contribute more to affect an image of low/middle gray level, while it is also well known that a color shift or color washout phenomenon is more noticeable with an image of low/middle gray level than that of other gray levels. Therefore, in order to make the pixel unit 400 have a wider range of viewing angles in a specific direction and a better display effect, it is wiser to conduct a compensation on the first displaying region D1 with higher display luminance, that is, a compensation is conducted on images of low/middle gray level.

The first alignment patterns located within the first displaying region D1 are, for example, a plurality of first alignment slits 416, while the second alignment patterns located within the second displaying region D2 are, for example, a plurality of second alignment slits 426. The extending directions of the first alignment slits 416 and the second alignment slits 426 respectively intersect the extending direction of the scan line 402 at a first acute angle θ1 and a second acute angle θ2, wherein the first acute angle θ1 is, for example, 40°, while the second acute angle θ2 is, for example, 45°.

Specifically, the first pixel electrode 410 includes a first cross-electrode pattern 412 and a plurality of first stripe-electrode patterns 414. The first cross-electrode pattern 412 is, for example, an electrode pattern with a cross-shaped layout able to divide the first displaying region D1 into four areas I, II, III and IV. Within each of the areas I, II, III and IV, a terminal of the first stripe-electrode pattern 414 connects the first cross-electrode pattern 412, while another terminal of the first stripe-electrode pattern 414 is far from the first cross-electrode pattern 412, and each space between two adjacent parallel ones of the first stripe-electrode patterns 414 defines a first alignment slit 416.

The second pixel electrode 420 includes a second cross-electrode pattern 422 and a plurality of second stripe-electrode patterns 414. The second cross-electrode pattern 412 is, for example, an electrode pattern with a cross-shaped layout able to divide the second displaying region D2 into four areas I, II, III and IV. Within each of the areas I, II, III and IV, a terminal of the second stripe-electrode pattern 424 connects the second cross-electrode pattern 422, while another terminal of the second stripe-electrode pattern 424 is far from the second cross-electrode pattern 422, and the second alignment slits 426 are located between two adjacent ones of the second stripe-electrode patterns 424. Compared to the extending direction of the second alignment slits 426, the extending direction of the first alignment slits 416 in the present embodiment is closer to the extending direction of the scan line 402.

Within a common display product, the required range of viewing angles in the extending direction of the scan line 402 is most often higher than the required range of viewing angles in the other directions, thus, it needs to enhance the display effect in the above-mentioned direction for fabricating the pixel unit 400. In the present embodiment, when the pixel unit 400 is displaying, the liquid crystal molecules would incline along the extending directions of the first alignment slits 416 and the second alignment slits 426. Specifically, the liquid crystal molecules in each of the areas I, II, III and IV within the first displaying region D1 or within the second displaying region D2 would incline towards four different directions so as to achieve the wide viewing effect. In addition, the extending direction of the first alignment slits 416 is closer to the extending direction of the scan line 402, so that the pixel unit 400 during displaying has a wider range of viewing angles in the extending direction of the scan line 402. In addition, the layouts of the first capacitor electrode 432 and the second capacitor electrode 434 make the first displaying region D1 have higher display luminance; therefore, the first alignment slits 416 located within the first displaying region D1 are helpful to conduct a compensation on the color shift or color washout phenomena occurring with an image of low/middle gray level as viewing in different viewing angles.

Usually, the ratio R of the luminance value of the pixel unit 400 at a large viewing angle to the luminance value of the pixel unit 400 at the direct front viewing under a gray level of 96 is taken as the index of color shift or color washout. When the value of P is closer to 1, it indicates a weaker color shift with the image the pixel unit produces. But by conducting a simulation calculation, the ratio P of the pixel unit 400 in the present embodiment is approximately 2.32 and that of the conventional pixel unit is about 2.7. As a result, the color shift of the pixel unit 400 in the present embodiment is not noticeable as that of the prior art so as to produce a better wide viewing quality. Besides, the pixel unit 400 displays a maximum luminance with an image which is equal to 99% of the maximum luminance with an image displayed by the prior art. Therefore in terms of the general performance, the pixel unit 400 not only has a better wide viewing display effect than the prior art, but also maintains good maximum display luminance.

It is obvious that in other embodiments of the present invention, the above-mentioned first alignment slits 416 and the second alignment slits 426 having different extending directions are allowed to be formed on the opposite electrode (not shown) of the LCD panel as fabricating the panel. In addition, the first alignment slits 416 and the second alignment slits 426 having different extending directions are further allowed to be respectively formed simultaneously on the opposite substrate (not shown) and the first pixel electrode 410 and simultaneously on the opposite substrate and the second pixel electrode 420.

Figure 5A:
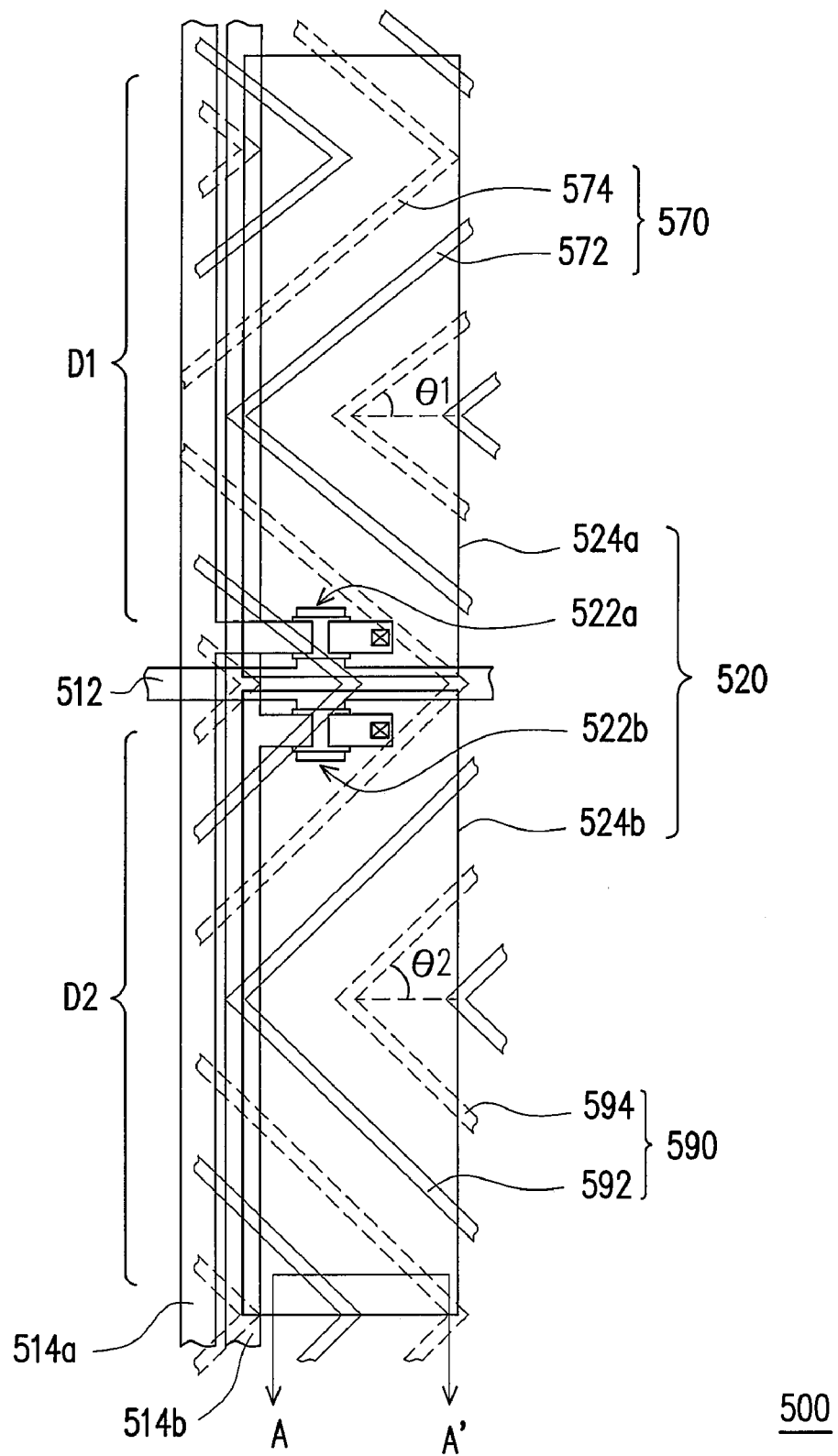
FIG. 5A is a partial schematic top view of an LCD panel according to another embodiment of the present invention.
Figure 5B:
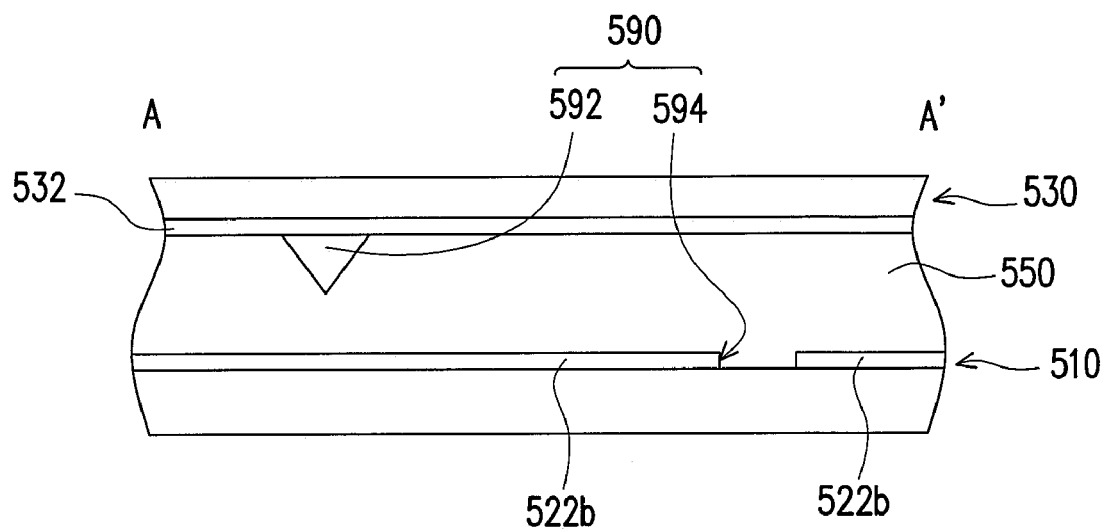
FIG. 5B is a cross-sectional drawing along A-A' of FIG. 5A.

Another design of the LCD panel is described in the following. FIG. 5A is a partial schematic top view of an LCD panel according to another embodiment of the present invention and FIG. 5B is a cross-sectional drawing along A-A' of FIG. 5A, wherein only a single pixel unit is shown in FIG. 5A, wherein only one pixel unit is shown as an example. Referring to FIGS. 5A and 5B, an LCD panel 500 includes an array substrate 510, an opposite substrate 530 and a liquid crystal layer 550, wherein the liquid crystal layer 550 is disposed between the array substrate 510 and the opposite substrate 530. A scan line 512, two data lines 514a and 514b, and a pixel unit 520 electrically connected to the scan line 512, and the data lines 514a and 514b are disposed on the array substrate 510. The pixel unit 520 includes a first active device 522a, a second active device 522b, a first pixel electrode 524a and a second pixel electrode 524b, wherein the first active device 522a is electrically connected to the first pixel electrode 524a and the second active device 522b is electrically connected to the second pixel electrode 524b. Besides, the first active device 522a and the second active device 522b are respectively electrically connected to the data lines 514a and 514b. Through the data lines 514a and 514b connected to the pixel unit 520, different data signals are input to the first active device 522a and the second active device 522b to define a first displaying region D1 and a second displaying region D2 wherein D1 and D2 have different display luminance from each other.

A first alignment pattern 570 is disposed within the first displaying region D1 and includes a plurality of first alignment protrusions 572 and a plurality of first alignment slits 574. A second alignment pattern 590 is disposed within the second displaying region D2 and includes a plurality of second alignment protrusions 592 and a plurality of second alignment slits 594. In the LCD panel 500, the first alignment protrusions 572 and the second alignment protrusions 592 are, for example, disposed on the opposite substrate 530, and the first alignment slits 574 and the second alignment slits 594 are, for example, the slit patterns formed, for example, on the first pixel electrode 524a and the second pixel electrode 524b. The extending direction of the first alignment pattern 570 intersects the extending direction of the scan line 512 at a first acute angle $\theta 1$, while the extending direction of the second alignment pattern 590 intersects the extending direction of the scan line 512 at a second acute angle $\theta 2$, wherein the first acute angle $\theta 1$ is smaller than the second acute angle $\theta 2$.

The liquid crystal molecules in the liquid crystal layer 550 are arranged in the orientations perpendicular to the extending direction of the first alignment protrusions 572 and the extending direction of the second alignment protrusions 592. Therefore, in the present embodiment, the orientation arrangements of the liquid crystal molecules located within the second displaying region D2 is closer to the extending direction of the scan line 512. Accordingly, when such an LCD panel 500 is assembled into a display product, the image of the second displaying region D2 has a larger range of viewing angles in the extending direction of the scan line 512. In short, the present embodiment uses, for example, two different data lines 514a and 514b to make different data signals input to the first pixel electrode 524a and the second pixel electrode 524b so as to enable the second displaying region D2 to produce a brighter display image. In this way, the LCD panel 500 not only has wide viewing display effect, but also reduces the color shift and color washout between different viewing angles in the extending direction of the scan line 512.

When the second displaying region D2 obtains a higher display luminance, making the extending direction of the second alignment pattern 590 close to the extending direction of the scan line 512 is helpful to conduct a compensation on the display image of low/middle gray level. The above-mentioned scheme makes the LCD panel 500 not only have wide viewing effect, but also gain a better display effect in the extending direction of the scan line 512 to meet the requirement of users. Besides, to create a better display effect of the LCD panel 500 in other specific directions, the extending directions of the first alignment pattern 570 and the second alignment pattern 590 can be changed, so that the extending direction of the alignment pattern located within an expected brighter displaying region is closer to the specific directions.

In other embodiments, the first alignment pattern 570 and the second alignment pattern 590 are not limited to a combination of the alignment slits and the alignment protrusions formed on different substrates; in fact, the first alignment pattern 570 and the second alignment pattern 590 of LCD panel 500 can be composed of multiple alignment protrusions only or multiple alignment slits (not shown) only. In addition, the first alignment pattern 570 and the second alignment pattern 590 can also be disposed on the array substrate 510 only or on the opposite substrate 530 only.

Figure 6:
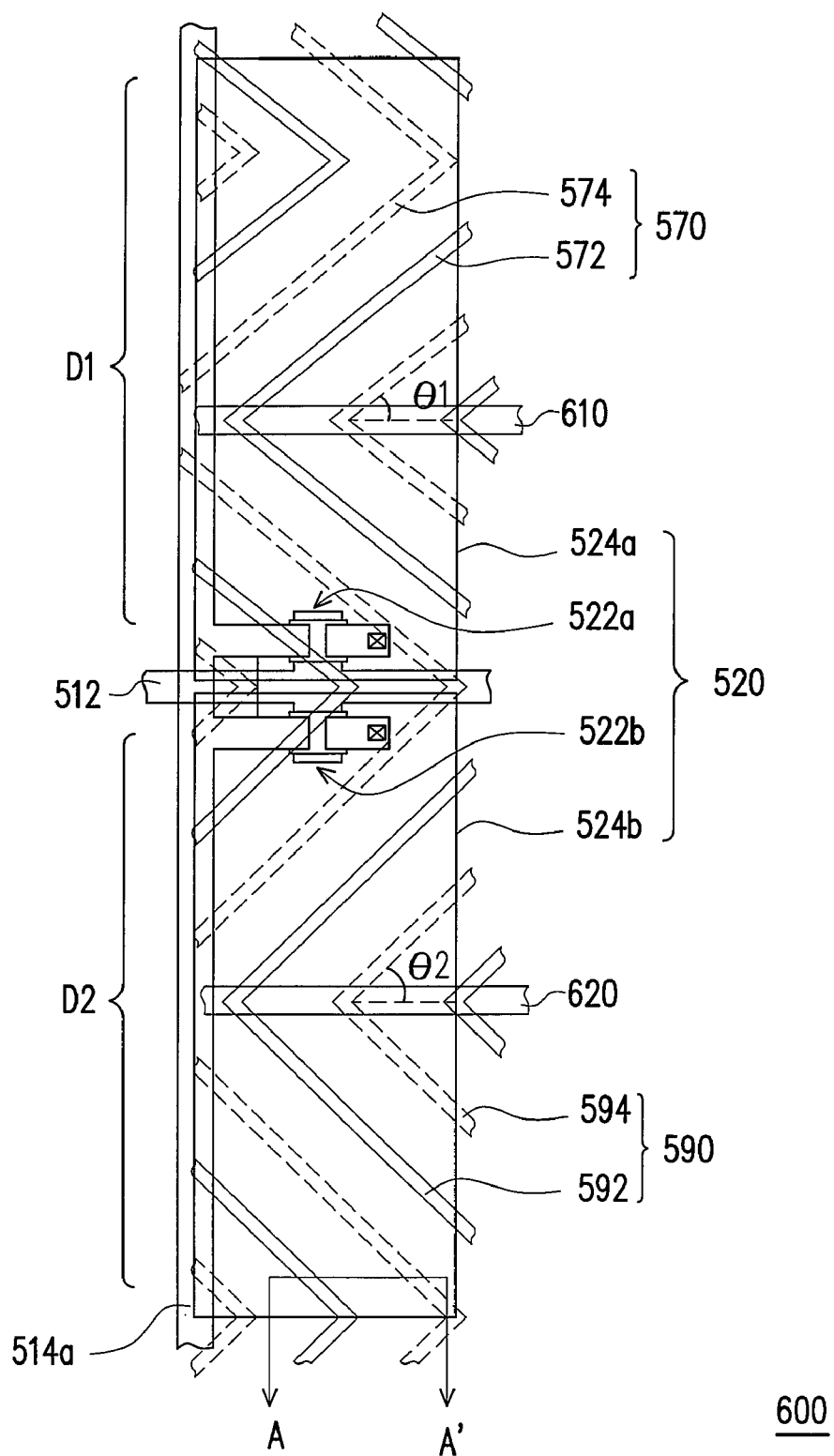
FIG. 6 a partial schematic top view of an LCD panel according to yet another embodiment of the present invention.

FIG. 6 a partial schematic top view of an LCD panel according to another embodiment of the present invention. Referring to FIG. 6, the LCD panel 600 is almost similar to the LCD panel 500, and the partial components in the LCD panel 600 are marked in the same notations as the LCD panel 500. The LCD panel 600 further includes a first capacitor electrode 610 and a second capacitor electrode 620. The first active device 522*a* and a second active device 522*b* are connected to the same data line 514*a*. In the present embodiment, the scheme to make the first displaying region D1 and the second displaying region D2 have different display luminance is depicted in the following.

When the LCD panel 600 is in displaying mode, the first capacitor electrode 610 and a second capacitor electrode 620 have or are applied with, for example, different voltages, which produces two different coupling capacitances between the first capacitor electrode 610 and the first pixel electrode 524*a*, and between the second capacitor electrode 620 and the second pixel electrode 524*b*. Thus, the first pixel electrode 524*a* and the second pixel electrode 524*b* connected to the same data line 514*a* produce different display voltages. On the other hand, the voltages of the first capacitor electrode 610 and a second capacitor electrode 620 are varied with different driving signals and the pixel design. The driving method of the LCD panel 600 is described in detail in the ROC Patent Application No. 95,132,144.

In the LCD panel 600, the extending directions of the first alignment pattern 570 and the second alignment pattern 590 can be modified according to different application requirements. In fact, the extending direction of an alignment pattern (570 or 590) located within a brighter displaying region can be adjusted to be close to a direction requiring a larger viewing angle; therefore, the LCD panel 600 is able to meet requirements of different viewing angles by users.

In summary, since the present invention employs different alignment patterns disposed within different displaying regions in a single pixel unit of the LCD panel, the event probability of color shift or color washout of the LCD panel in a specific direction is reduced, furthermore, a wider range of viewing angles in the specific direction is obtained. In addition, the display luminance of the LCD panel provided by the present invention is not largely reduced by the alignment pattern influence. Therefore, the LCD panel of the present invention has a wider range of viewing angles in the specific direction and meanwhile keeps a good display quality as viewing at a smaller viewing angle or as front viewing.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal display panel, comprising:
   an array substrate, comprising a plurality of scan lines, a plurality of data lines and a plurality of pixel units, wherein each pixel unit comprises a first active device, a first pixel electrode and a second pixel electrode, and wherein the first active device is electrically connected to the first pixel electrode, and the first pixel electrode is separated from the second pixel electrode to define a first displaying region and a second displaying region;
   an opposite substrate, comprising an opposite electrode;
   a liquid crystal layer, disposed between the array substrate and the opposite substrate;
   a plurality of first alignment patterns, located within the first displaying regions; and
   a plurality of second alignment patterns, located within the second displaying regions, wherein the extending directions of the first alignment patterns and the second alignment patterns respectively intersect that of the scan lines at a first acute angle and a second acute angle, and wherein the first acute angle is smaller than the second acute angle.

2. The liquid crystal display panel according to claim 1, wherein the first alignment patterns comprise a plurality of first alignment slits.

3. The liquid crystal display panel according to claim 2, wherein the first alignment slits are formed on the opposite electrode.

4. The liquid crystal display panel according to claim 2, wherein the first alignment slits are formed on the first pixel electrodes.

5. The liquid crystal display panel according to claim 2, wherein each of the first pixel electrodes comprises a first cross-electrode pattern and a plurality of first stripe-electrode patterns, the first cross-electrode pattern divides the first displaying region into a plurality of areas, wherein within each area, a terminal of one of the first stripe-electrode patterns is connected to the first cross-electrode pattern, and another terminal of the one of the first stripe-electrode patterns is far from the first cross-electrode pattern, and wherein the first alignment slits are located between the first stripe-electrode patterns and the first cross-electrode pattern.

6. The liquid crystal display panel according to claim 1, wherein the second alignment patterns comprise a plurality of second alignment slits.

7. The liquid crystal display panel according to claim 6, wherein the second alignment slits are formed on the opposite electrode.

8. The liquid crystal display panel according to claim 6, wherein the second alignment slits are formed on the second pixel electrodes.

9. The liquid crystal display panel according to claim 6, wherein each of the second pixel electrodes comprises a second cross-electrode pattern and a plurality of second stripe-electrode patterns, the second cross-electrode pattern divides the second displaying region into a plurality of areas, wherein within each area, a terminal of one of the second stripe-electrode patterns is connected to the second cross-electrode pattern and another terminal of the one of the second stripe-electrode patterns is far from the second cross-electrode pattern, and the second alignment slits are located between the second stripe-electrode patterns and the second cross-electrode pattern.

10. The liquid crystal display panel according to claim 1, wherein the first alignment patterns comprise a plurality of first alignment protrusions disposed on at least one of the array substrate and the opposite substrate.

11. The liquid crystal display panel according to claim 1, wherein the second alignment patterns comprise a plurality of second alignment protrusions disposed on at least one of the array substrate and the opposite substrate.

12. The liquid crystal display panel according to claim 1, wherein each pixel unit further comprises a second active device electrically connected to a corresponding scan line and a corresponding data line, and the second active device is electrically connected to the second pixel electrode.

13. The liquid crystal display panel according to claim 12, wherein the first active device is electrically coupled to the second active device.

14. The liquid crystal display panel according to claim 12, wherein the first active device and the second active device are respectively electrically connected to different data lines.

15. The liquid crystal display panel according to claim 1, wherein the array substrate comprises a plurality of first capacitor electrodes and a plurality of second capacitor electrodes, the first capacitor electrodes are located within the first displaying regions and the second capacitor electrodes are located within the second displaying regions.

16. The liquid crystal display panel according to claim 15, wherein the first capacitor electrodes have a voltage different from that of the second capacitor electrodes.

17. The liquid crystal display panel according to claim 1, wherein the first acute angle is about 35° to 45°.

18. The liquid crystal display panel according to claim 17, wherein the second acute angle is about 45° to 55°.

19. The liquid crystal display panel according to claim 1, wherein the second acute angle is about 45° to 55°.

20. An array substrate, comprising:
a plurality of scan lines;
a plurality of data lines;
a plurality of pixel units, wherein each pixel unit comprises a first active device, a first pixel electrode and a second pixel electrode, and wherein the first active device is electrically connected to the first pixel electrode, and the first pixel electrode is separated from the second pixel electrode to define a first displaying region and a second displaying region;
a plurality of first alignment patterns, located within the first displaying regions; and
a plurality of second alignment patterns, located within the second displaying regions, wherein the extending directions of the first alignment patterns and the second alignment patterns respectively intersect that of the scan lines at a first acute angle and a second acute angle, and wherein the first acute angle is smaller than the second acute angle.

* * * * *